May 24, 1932.  R. NESTLER  1,859,456
DRAWING TABLE
Filed Aug. 27, 1930   2 Sheets-Sheet 1

INVENTOR:
Richard Nestler

May 24, 1932.  R. NESTLER  1,859,456
DRAWING TABLE
Filed Aug. 27, 1930   2 Sheets-Sheet 2
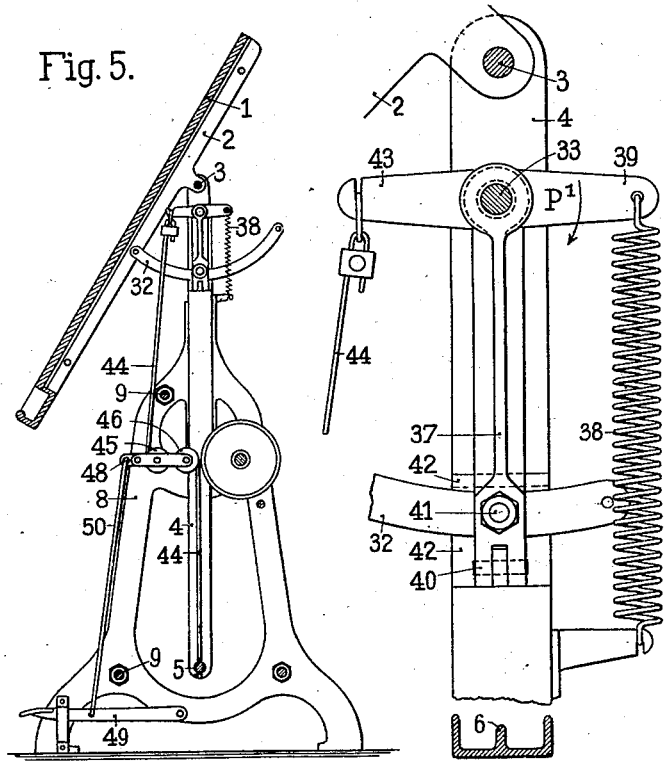
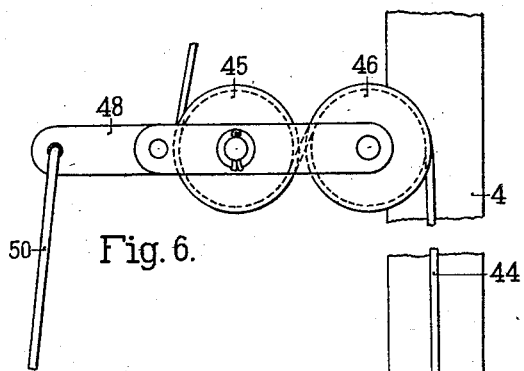
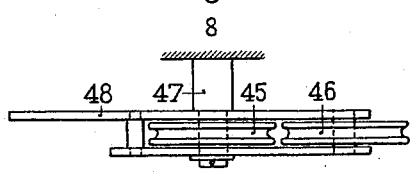
INVENTOR:
Richard Nestler Patented May 24, 1932

1,859,456

UNITED STATES PATENT OFFICE

RICHARD NESTLER, OF LAHR, GERMANY

DRAWING TABLE

Application filed August 27, 1930, Serial No. 478,144, and in Germany October 2, 1929.

My invention relates to a drawing-table provided with a drawing-board adapted to be adjusted or located to occupy various positions and inclinations with relation to the ground, that is to say, both in perpendicular respects and in angular regards.

The chief object of my invention is to provide a drawing-table of the indicated type wherein the drawing-board will be maintained in its adjusted inclined position by friction and the weight of the drawing-board will be balanced by a spring coiled about a horizontal shaft and adapted to be adjusted to exert a controllable tension or stress, and which will be fixed in its adjusted position or stress by means of a pawl and ratchet, a suitable pedal and cooperating intermediate means being preferably provided for operating a member, such as a brake, adapted to hold and secure the drawing-board in its adjusted inclined position, so that upon actuation of the pedal the brake will be disengaged and the drawing-board be ready for being moved about its pivots for the purpose of changing its inclination.

With the above recited and ancillary objects in view, reference is made to the following specification and annexed drawings in which there is exhibited one example or embodiment of the invention which in no way is intended as a limitation upon the scope of the subjoined claims as it is to be clearly understood that variations and modifications which fairly fall within the scope of said claims may be resorted to when found expedient.

In the accompanying drawings, forming a part of this specification, and showing for purposes of exemplification, a preferred form and manner in which the invention may be embodied and practised, but without limiting the claimed invention to such illustrating instance:

Figure 5 is a view in vertical section on the line V—V of Figure 2;

Figure 6 is a view of the mechanism or arrangement for fixing the drawing-board in its inclined position, drawn on a larger scale;

Figure 7 is a similar view of the said mechanism or arrangement viewed in a direction corresponding to the plane of the cardboard, and Figure 8 is a view in top plan of the same mechanism or arrangement.

Parts which are repeated in the several figures bear the same reference characters in each case.

Figure 1:
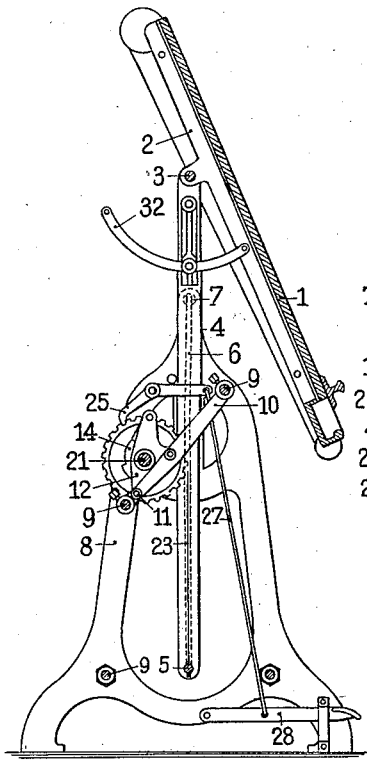
Figure 1 is a view in elevational cross-section of the drawing-table taken on the line I—I of Figure 2 which shows in elevation the rear side thereof.
Figure 2:
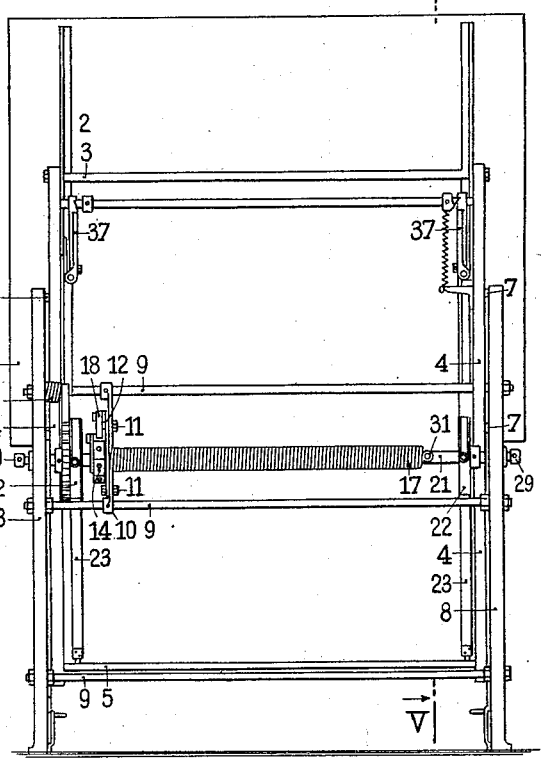

Referring to Figures 1 and 2 the drawing-board is firmly attached to and supported by two L-irons 2 pivotally connected with a horizontal rod 3 interconnecting two vertical guiding bars 4, at the upper ends thereof while the lower ends thereof are interconnected by similar rod 5, so that the bars 4 and rods 3 and 5 constitute a rigid rectangle. The two bars 4 are each provided with a median longitudinal rib or ridge 6 projecting from the outer surface thereof, as indicated in Figure 1 by dotted lines, and adapted to slide each in a slit of the head of a bolt 7 whereof the stem is pivotally mounted in the top end of a two-footed stanchion 8 of the drawing-table, the two stanchions 8 constituting together with their horizontal braces 9, the frame of the drawing-table.

Figure 3:
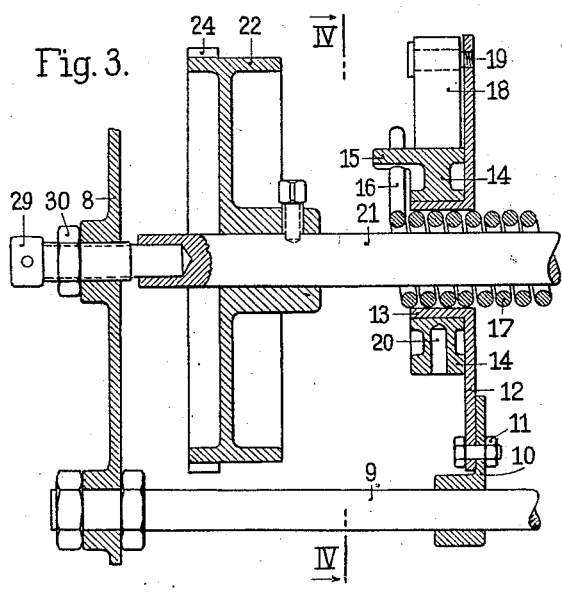
Figure 3 is a sectional view of the mechanism serving to balance the weight of the drawing-board and the guiding means thereof, the section being taken on the line III—III of Figure 4 which in turn is a view in section on the line IV—IV of Figure 3.

Firmly secured to the two upper horizontal rods or braces 9 rigidly interconnecting the two stanchions 8, are the shaped extremities of a connecting rod 10. Secured to the rod 10, preferably by means of bolts and nuts 11, is a three armed or star-shaped member 12 having a hub 13 on which a ratchet wheel 14, see Figure 3, is journalled. A lug 15 projecting laterally from the ratchet wheel 14 serves as an abutment for the one end 16 of a coiled spring 17. Undesired revolutions or angular displacements of the ratchet wheel 14 under the action of the spring are prevented by a pawl 18 pivotally attached to a pin 19 provided in the free end of the upper arm of the star-shaped member 12, as will be seen in Figure 4.

Figure 4:
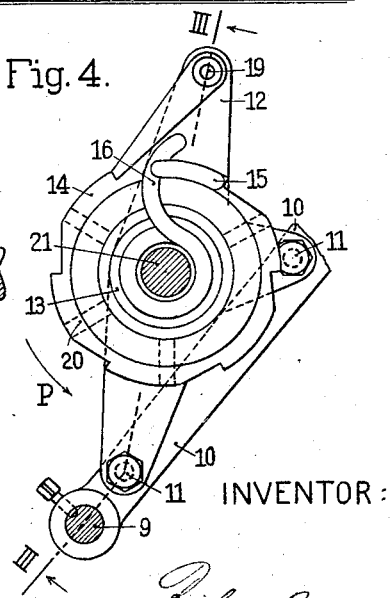

The ratchet wheel 14 is provided with a number of radial holes 20 for the reception of a tool such as a pin for manually turning the wheel in the direction indicated by an arrow P in Figure 4, for the purpose of stressing the spring 17, when required, and preventing, if desired the ratchet wheel from rotating too rapidly in the opposite direction under the action of the spring, when the pawl 18 is disengaged.

As will be seen in Figures 2 and 4 the left-sided end of the spring 17 is housed in the hub of the star-shaped member 12, while the spring 17 in the full of its length is coiled about a shaft 21 provided, at or near either end thereof, with a pulley 22, see Figure 2, having on its peripheral surface one end of a steel-band 23 secured thereto, the other end is adjustably attached to the horizontal rod 5. The one of the two pulleys 22 is shaped to form a ratchet, see Figure 3, for engagement with a pawl 25, see Figure 1, controlled by a spring 26. The tail of the pawl 25 is connected with the upper end of a drawing rod or wire 27 whose lower end is attached to a pedal lever 28.

The shaft 21 is revolubly supported by its extremities journalled in bearings formed in the two stanchions 8. The shaft 21 is prevented from axial movement, but adapted to be readily removed from the bearing supports for the purpose of interchanging the spring 17. Thus, for instance, the shaft 21 may be provided at its extremities with axial bores, as will be seen in Figure 3, where, however, only one end of the shaft is shown, but the other or broken off end of the shaft shown in Figure 3 is of the very same configuration and arrangement. In the bore engages the smooth end of a screw 29 to form a bearing pivot, while threaded portion of the screw stem is supported in a comformingly threaded bore of the stanchion 8. The head of the pivot screw 29 is provided with a radial bore 50 as to afford a good purchase for a center-punch or other tool for manipulating the screw, a counter-nut 30 being provided on the threaded portion of the screw for securing the latter in set position, as will be seen in Figure 3.

As hereinbefore stated the shaft 21 can be readily removed when required, for the purpose of exchanging the spring 17. To this end the rectangular structure composed of the rods 3, 5 and the bars 4 is lowered to the ground or otherwise supported and the screws (nuts) 11 and 29 then are unscrewed, the latter being withdrawn from the parts 8 sufficiently to permit of the shaft 21 being removed rearwards from the frame 8, 9. If required also the steel bands 23 may be disconnected from the rod 5 for this purpose. The spring 17 however, can also be removed for the exchange purpose if the shaft is supported in the frame 8, 9 in a manner that the same can be withdrawn through one of the stanchions 8 after its connection with the pulleys 22 and with the spring 17 at 31. Even if the diameter of the one of the two screws 29 is made to be greater than that of the shaft 21 and therefore the threaded bore in the stanchion is correspondingly greater, the shaft may be withdrawn from the frame through the said bore. In both cases the shaft can be removed from the frame without requiring the use of any tools for the purpose.

As regards the ratchet 14 it is to be noted that the same may be disposed and mounted otherwise than illustrated in Figures 1 to 4, for instance, the ratchet may be loosely mounted on the shaft 21 immediately adjacent to the pulley 22 shown in Figure 4, so that the three-armed star-shaped member 12 will be dispensable, since the pivot pin or screw 29 may be located, in such a case, in the connecting rod or member 10 provided that the latter is conformingly shaped for the purpose. If the connecting member 10 would be mounted on the rods 9 so as to be adapted to be laterally removed or taken off from the rods instead of being withdrawn therefrom by a sliding lengthwise movement, the shaft 17 then could just as well be removed from the frame 8, 9 in a direction perpendicular to the drawing board 1 even if the shaft is supported by the frame in the manner shown in drawings.

Firmly and concentrically secured to the L-irons 2 of the drawing board 1, about midway between their ends, are a pair of adjustable segmental or quadrant bars 32, one on either iron 2, and in the bars 4 there is journalled a shaft 33. Fixed to the shaft 33 and suitably spaced from the bars 4 are two sleeves, 34 adapted to engage, with their lateral cam faces 35, into opposite recesses 36 of clamping levers 37, the parts 34, 35, 36 and 37 constituting what may be called a frictional braking device. Due to the action of a coiled spring 38, the two ends of which are connected with a lug of the bar 4 and with one arm of a lever 39 rigidly attached to one of the two sleeves 34, as shown in Figure 6, the said lever 39 will be caused to be rotated, together with the shaft 33, in the direction of the arrow $P^1$, shown in Figure 6 and accordingly due to the action of the cam faces 35, the clamping levers 37 are moved about their pivots 40 in the direction indicated by the arrow P, see Figure 7, laterally or outwards until the screws 41 of the levers 37 abut and are pressed against the side-faces of the quadrants 32 and consequently the latter are pressed against the stationary plates 42.

Fixed to the arm 43 of the lever 39 is a cable 44 whereof the lower end is connected with the rod 5 of the rectangular structure or frame 3, 4, 5 and which is caused to partially encircle a pair of tension-pulleys 45, 46. The pulley 45 is mounted to revolve about a pivot pin 47 fixed in the stanchion 8, as illustrated in Figure 8, and pivotally supporting the bearing frame 48 of the other pulley 46. The rope or cable 44 thus is adapted to release, when actuated by means of the pedal 49 the brakes constituted by the parts 34 to 37 and whereof one is provided on either side of the drawing table.

Owing to the described arrangement of the pulleys 45 and 46 it will be possible to raise or lower the rectangular frame 3, 4, 5 carrying the clamping device, between the stanchions 8, when required, and to move the cable 44 correspondingly up or down at the same time without influencing or interfering with the positions of the lever 43 and the pivotally mounted pulley bearing frame or lever 48. On the other hand, in case of depressing the pedal lever 49 the pulley bearing frame 48 will be moved about the pivot pin 47 through the agency of the connecting rod or wire 50 with the result that a pull will be exerted on the cable 44 and consequently the shaft 33 together with the sleeves 34 and the lever 43 will be rotated in a direction opposed to that indicated by the arrow P in Figure 4, so that the quadrants 32 will be released for the purpose of changing the inclination or angular position of the drawing-board 1.

From the foregoing, it is believed, that the advantages and novel features of my invention will be readily understood and, therefore, further detail description is deemed unnecessary.

I claim:—

1. A drawing table of the character described comprising a support, a vertically adjustable frame in said support, a drawing board carried pivotally at the upper end of the frame, a rotatable, horizontal shaft mounted in the support, pulleys on said shaft, steel bands connected to said pulleys and to the frame for carrying the latter, a plate connected to the support, a boss on said plate surrounding the shaft, a coil spring surrounding the shaft, said spring secured at one end to the shaft and resting at the other end in said boss, a ratchet wheel arranged to rotate about said boss, a detent pawl on the plate engaging said ratchet wheel, a lug on the ratchet wheel engaging the contiguous end of the spring for maintaining the latter in tension, a ratchet device for retaining the shaft, in opposition to the spring, with the frame in different positions, and foot-operated means for releasing the shaft.

2. A structure as claimed in claim 1 wherein the support for the shaft comprises detachable pivot pins engaging in bores at the ends of the shaft.

3. The structure claimed in claim 1 in combination with segmental stays connected to the drawing board, guides for said stays connected to the frame, a lever pivoted to the frame for clamping one of said segments to its guide, a cam mounted on the frame for operating the clamping lever, a cam operating lever connected to the cam, a spring acting on said cam operating lever and maintaining the clamping lever normally in clamping position, a releasing lever pivoted to the support, a pair of pulleys mounted on said releasing lever, one of said latter pulleys being concentric with the pivot of the lever, a cable connected at one end to the lower part of the frame and at the other end to the cam operating lever, said cable being guided in zig-zag on said latter pulleys to allow the cam operating lever to be turned for releasing the clamping lever by means of said releasing lever, and a foot lever coupled to the releasing lever for operating the latter.

RICHARD NESTLER.